July 25, 1961  A. L. LEE ET AL  2,993,552
VEHICLE STEERING MECHANISM
Filed Oct. 21, 1957  2 Sheets-Sheet 2

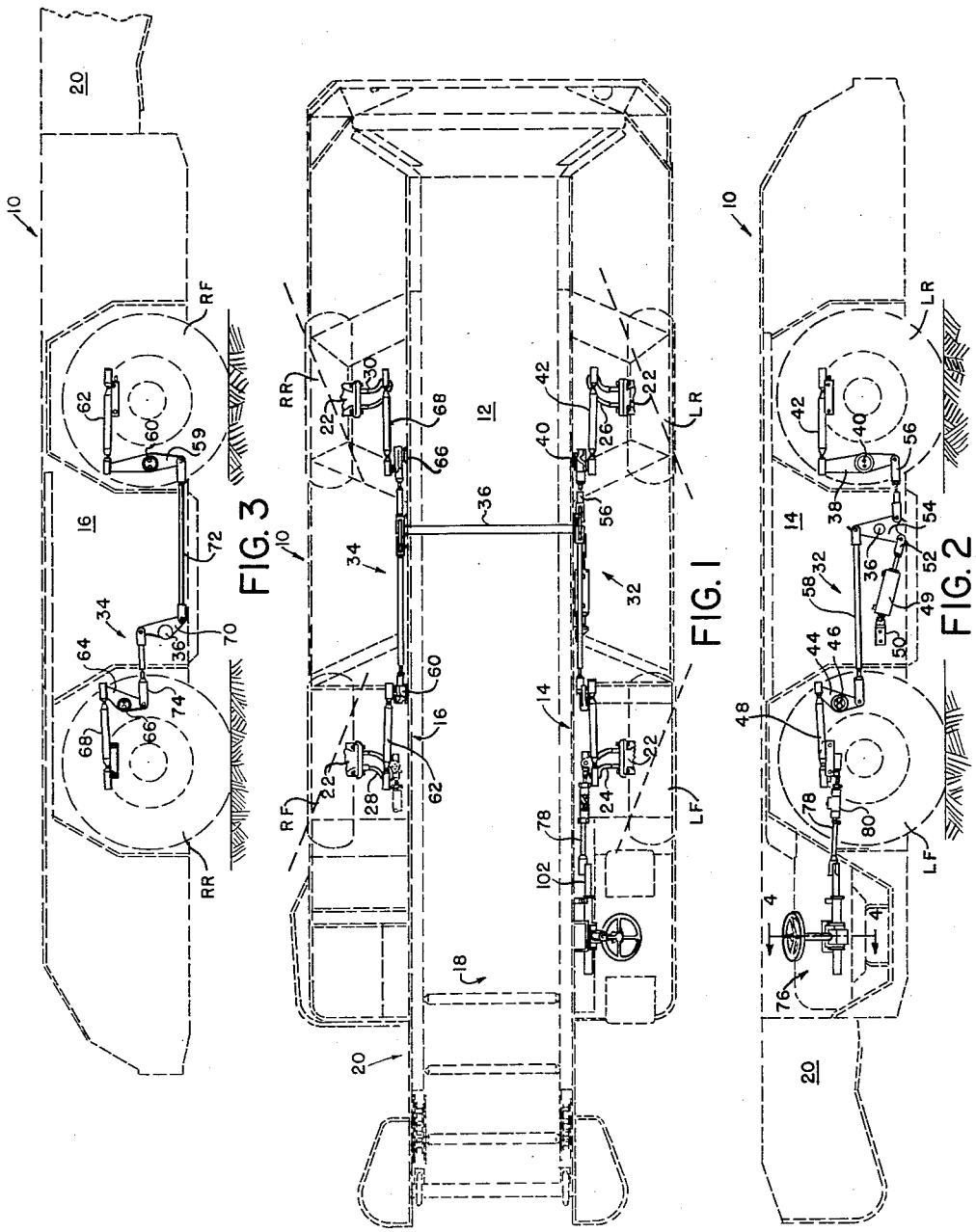

INVENTORS.
ARTHUR L. LEE
BY ARTHUR B. COVAL

THEIR ATTORNEY

United States Patent Office 2,993,552
Patented July 25, 1961

2,993,552
VEHICLE STEERING MECHANISM
Arthur L. Lee and Arthur B. Coval, Columbus, Ohio, assignors to Consolidation Coal Company, a corporation of Pennsylvania
Filed Oct. 21, 1957, Ser. No. 691,376
4 Claims. (Cl. 180—79.2)

The present invention relates to a steering mechanism for self-propelled vehicles having front and rear pairs of steerable wheels and more particularly to an improved mechanism for steering mine haulage vehicles having front and rear pairs of steerable wheels.

The design and construction of mine haulage vehicles are a function of a number of seemingly irreconcilable operational requirements. Economic considerations, on the one hand, dictate that a haulage vehicle have a large load carrying capacity, and as a consequence thereof it must be capable of developing a great amount of power. This power is preferably distributed to all of the wheels. On the other hand, operating conditions within the mine require that a haulage vehicle be low and narrow in construction. It must be capable of passing through low galleries and narrow tunnels and have a short turning radius in order to navigate the tight, narrow turns.

To achieve the desired results, road clearance has been sacrificed by extending the material carrying structure of the haulage vehicle far down between the wheels to increase the load carrying capacity, and four wheel steering was developed to provide maneuverability. This arrangement resulted in a complicated design problem in that numerous steering rods or link members and levers, which are necessarily connected to all wheels, have been placed in compact relationship with other elements of the haulage vehicle in the limited space available. Moreover, the complexity of haulage vehicle design has been increased by the addition of a movable discharge boom.

It is desirable from an operational standpoint to keep the number of moving parts, particularly gears and gear segments, to a minimum. This is vital in the continuing efforts to reduce excessive wear caused by the dust and grit inherent in mining operations. Moreover, for purposes of repair and upkeep the various steering link members and levers on one side of the vehicle should be interchangeable with equivalent members on the other side of the vehicle.

Haulage vehicles in the past have generally employed individual prime movers for each wheel, or in the alternative, two prime movers operating either laterally spaced pairs of longitudinally spaced pairs of wheels. Arthur L. Lee, a co-inventor of the present invention, has recently developed a haulage vehicle having, among other things, a drive means that employs a single prime mover, which is described in U.S. Patent 2,754,015 entitled, "Mine Haulage Vehicle."

The transmission or the propellor shafts comprising the drive means described in the aforementioned Patent 2,754,015 are incompatible with the location, construction and operation of presently available four wheel steering mechanisms. As a result, we have developed the present improved steering mechanism, wherein the various steering link members operate so that their movement is confined primarily to essentially vertical longitudinal planes situate along each side of the load carrying structure and substantially parallel to the longitudinal axis of the vehicle. Better utility of space results, since the steering mechanism in no way interferes with the positioning of other haulage vehicle elements between the front and rear wheels on either side.

The steering mechanism is arranged so that the linkages and levers are substantially in mirror symmetry with interchangeable parts. In addition, the levers are arranged so that there is an automatic differentiation between the steering angles of the pairs of wheels located on opposite sides of the vehicle.

It is therefore the principal object of our invention to provide an improved steering mechanism for a mine haulage vehicle that is compact and has a maximum number of interchangeable parts.

Another object of our inventioin is to provide an improved steering mechanism for a mine haulage vehicle that has a single transverse member that connects the steering linkages on one side of the vehicle with the linkages on the other side of the vehicle.

Another object of this invention is to provide an improved steering assembly arranged to actuate the steering mechanism.

These and other objects and advantages of this invention will be more completely disclosed and described in the following specification, the accompanying drawings and the appended claims.

In the accompanying drawings, to be taken as part of this specification, we have fully and clearly illustrated our invention, in which drawings:

FIGURE 1 is a top plan view of a mine haulage vehicle.

FIGURE 2 is a view in side elevation of one side of the haulage vehicle illustrated in FIGURE 1.

FIGURE 3 is a view in side elevation of the other side of the haulage vehicle illustrated in FIGURE 1.

Figure 4:
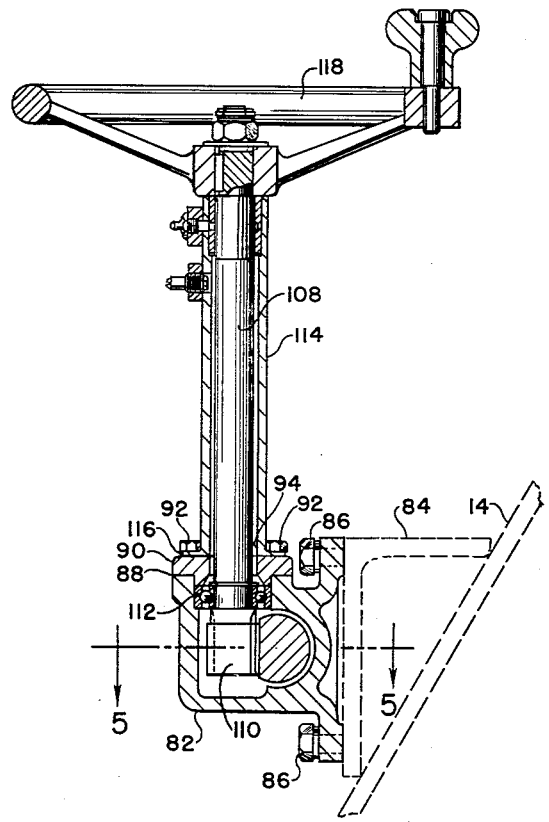
FIGURE 4 is a fragmentary cross sectional view in elevation of the steering assembly taken along the line 4—4 of FIGURE 2.

Although a mine haulage vehicle is operated in either direction with equal facility, we have, for purposes of description, designated the discharge end of the vehicle as the front end. The pivoted boom structure is located at the discharge or front end of the vehicle. Also, the side of the vehicle illustrated in FIGURE 2 will be designated the left side of the vehicle and the side illustrated in FIGURE 3 will be designated as the right side of the vehicle.

Referring to FIGURES 1, 2 and 3 there is illustrated a mine haulage vehicle with the outline of the mobile body 10 shown in broken lines. The mobile body 10 has a recessed material haulage compartment 12 which extends lengthwise thereof between a pair of vertical side walls 14 and 16. The bottom of the recessed material haulage compartment extends downwardly between the wheels to a position below the axis of rotation of the propelling wheels. The material haulage compartment 12 has an endless conveyor 18 extending along the bottom thereof. A boom structure 20 is pivotally secured to the front end of the mobile body 10 and is arranged to pivot vertically so that the material carried by the haulage vehicle may be discharged therefrom into other transporting means.

The mobile body is supported and propelled by four wheels designated respectively LF, LR, RF and RR. The letters indicate both the side of the vehicle and the relative position of the wheel in respect to the front and rear ends of the vehicle. All of the wheels are power driven and are also steerable. The wheels support the mobile body 10 by means of pivoted bracket members (not shown) that have a portion rigidly secured to the respective vehicle side walls and a movable portion connected to the respective wheel. Fragmentary portions of the movable bracket member are illustrated in FIGURE 1 and are designated by the numeral 22. Secured to and extending inwardly from each of the pivoted portions of the bracket member 22 are steering yokes, which although substantially similar in construction, will be designated respectively by numerals 24, 26, 28 and 30 because of their association with the different steerable wheels. Each of the steering yokes has a ball type connecting member (not shown) adapted to receive a mating socket portion of steering link members.

The wheels LF and LR are steered by means of the left side portion of the steering mechanism generally designated by the numeral 32. The left side portion of the steering mechanism is illustrated in detail in FIGURES 1 and 2. The wheels RF and RR are steered by means of the right side portion of the steering mechanism generally designated by the numeral 34. The right side portion of the steering mechanism is illustrated in detail in FIGURES 1 and 3. The right and left side portions of the steering mechanism are operatively connected to each other by means of a transverse connecting member 36 in a manner to be later described.

The left side portion of the steering mechanism 32 includes an elongated lever 38 adjacent the left rear wheel LR (FIGURE 2). The lever 38 is pivotally secured to the vehicle side wall 14 in a substantially vertical plane by means of a pivot pin 40. The lever 38 is connected at its upper end to the steering yoke 26 by means of a link member 42. As the lever 38 is pivoted about the pivot pin 40 the steering link member 42 and yoke 26 pivot wheel LR about its substantially vertical steering axis.

Another lever 44 is pivotally secured to the vehicle side wall 14 adjacent the left front wheel LF by means of a pivot pin 46. The upper portion of the lever 44 is connected to the steering yoke 24 by means of a link member 48. Thus as lever 44 is pivoted about pivot pin 46 the link 48 and yoke 24 pivot the left front wheel LF about its vertical steering axis. The levers 38 and 44 are actuated by means of a servomotor 49. The servomotor 49 is pivotally secured at one end 50 to the vehicle side wall 14 and has an actuating arm 52 extending outwardly from the other end. The actuating arm 52 is connected at its free end to a triangular lever 54 that is rigidly secured to the free end of the transverse connecting member 36.

The transverse connecting member 36 extends through the vehicle side walls 14 and 16 below the bottom of the haulage compartment 12 and is rotatable in these apertures.

The lower portion of the elongated lever 38 is connected to the triangular lever 54 below the transverse connecting member 36 and adjacent the actuating arm 52 by means of a link member 56. The lever 44 is connected to the triangular lever 54 above the transverse connecting rod 36 by a link member 58. With this arrangement when the actuating arm 52 pivots the triangular lever 54 in a clockwise direction as viewed in FIGURE 2, wheel LR through the link member 56, lever 38, link member 42 and steering yoke 26 pivots about its substantially vertical steering axis in a clockwise direction as viewed in FIGURE 1. Simultaneously the wheel LF through the link member 58, lever 44, link member 48 and steering yoke 24 pivots about its steering axis in a counterclockwise direction.

The right side portion of the steering mechanism 34 shown in FIGURES 1 and 3 has an elongated lever 59 located adjacent the right rear wheel RF. The elongated lever 59 is similar to elongated lever 38 located adjacent the left rear wheel LR. The lever 59 is pivotally secured to the vehicle side wall 16 by means of a pivot pin 60 adjacent the right front wheel RF. The top portion of lever 59 is connected to steering yoke 28 (FIGURE 1) by a link member 62 so that wheel RF pivots about its steering axis when lever 59 pivots about pin 60. A short lever 64 is pivotally secured to the vehicle side wall 16 adjacent the right rear wheel RR by a pivot pin 66. The short lever 64 is similar to lever 44 located adjacent the left front wheel LF. The top portion of lever 64 is connected to steering yoke 30 by a link member 68 so that the wheel RR pivots about its steering axis when the lever 64 pivots about the pin 66. Another lever 70 is rigidly secured to the other end of the transverse connecting rod 36 and has its lower portion connected to the lower portion of lever 59 by means of a link member 72 so that the lever 59 will pivot or rotate about the pivot pin 60 in the same direction as the lever 70. The upper portion of the lever 70 is connected to the lower portion of lever 64 by a link member 74. Thus as viewed in FIGURES 1 and 3 when the transverse connecting member 36 is rotated in a clockwise direction in a horizontal plane the right front wheel RF will rotate in a clockwise direction about its vertical steering axis (FIGURE 1) and the right rear wheel RR will rotate in a counterclockwise direction about its vertical steering axis. While the servomotor 49 is shown mounted on the left side of the vehicle adjacent the lever 54, the servomotor may be positioned on either side of the vehicle and employed to actuate the entire steering mechanism.

The servomotor 49 is actuated to provide the desired steering of the wheels by the steering assembly generally designated by the numeral 76. The steering assembly 76 is connected to the steering yoke 24 by means of a link member 78 and a valve member 80. The valve member 80 is aligned with the link member 78 and under normal operating conditions is employed to provide hydraulic fluid under pressure to the servomotor 49. The valve 80 also includes an override mechanism (not shown) that under given conditions may be employed as a portion of the linkage between the steering assembly 76 and the yoke 24.

Figure 5:
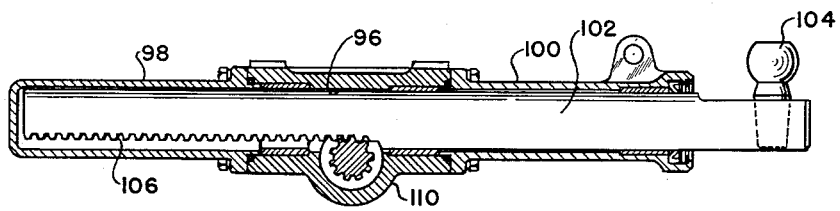
FIGURE 5 is a fragmentary cross sectional plan view of the steering assembly taken along the line 5—5 of FIGURE 4.

The steering assembly 76 is illustrated in detail in FIGURES 4 and 5 and includes a gear housing 82 secured to the vehicle side wall 14 by means of an angle member 84 that is preferably welded to the sloping portion of the vehicle side wall 14. The gear housing 82 is secured to the angle 84 by means of bolt members 86 and has an open top portion 88 with a mating cap member 90 that is secured to the gear housing 82 by means of bolts 92. The cap member 90 has a vertical aperture 94 therethrough. The gear housing 82 has a horizontal bore 96 extending therethrough. A cup shaped cap member 98 is secured to the side wall of the gear housing 82 and forms a closure over one end of the horizontal bore 96. A tubular member 100 is axially aligned with the horizontal bore 96 and is secured to the other side wall of the gear housing 82. A rod like rack member 102 is positioned within the horizontal bore 96, the cup shaped member 98 and the tubular member 100 and is arranged to move reciprocally therein. The rack member 102 has a ball joint 104 adjacent one end that is operatively secured to the link member 78 so that movement of the rack member 102 is transmitted to the valve member 80. The rack member 102 has a plurality of gear teeth 106 formed on one side thereof.

A vertical steering shaft 108 extends into the gear housing 82 and has a pinion type gear 110 secured to one end thereof. The shaft 108 is rotatably supported within the gear housing 82 by means of a roller bearing 112. A tubular steering shaft housing 114 is arranged coaxially with the steering shaft 108 and has a lower flange portion 116 that is secured to the gear housing cap member 88. A steering wheel 118 is rigidly secured to the free end of the steering shaft 108 and is arranged to rotate the shaft 108 which in turn actuates the pinion gear 110 to move the rack member 102 reciprocally in the gear housing horizontal bore 96. With this arrangement the force exerted by the rack member 102 is linear and parallel to the various link members.

With the heretofore described construction the steering mechanism left side portion 32 and steering mechanism right side portion 34 are arranged adjacent to the vehicle side walls 14 and 16 thus providing adequate space between the vehicle side walls 14 and 16 and the propelling wheels for other components of the vehicle. It should also be noted that the various link members are arranged to move in substantially vertical planes that are parallel to the longitudinal axis of the vehicle 10. This feature again provides the needed space for other components which are required on the vehicle.

The steering assembly rack member 102 when actuated also moves longitudinally and is physically connected to the steering mechanism left side portion 32. With this arrangement the operator of the vehicle may manually control the steering mechanism in the event the servo mechanism 39 becomes inoperative.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A mine haulage vehicle having in combination a mobile body with a recessed material haulage compartment extending lengthwise thereof, a pair of front and a pair of rear steerable wheels carried by said mobile body on opposite sides of said material haulage compartment, each of said wheels having a steering yoke secured thereto and arranged to pivot said wheels about substantially vertical steering axes, said recessed material haulage compartment extending downwardly between said pairs of steerable wheels to a position below the axes of rotation of said steerable wheels, a connecting member extending transversely of said mobile body beneath said material haulage compartment and between said pair of front wheels and said pair of rear wheels, a first lever secured substantially intermediate its ends to one end of said connecting member, a second lever secured substantially intermediate its ends to the other end of said connecting member, each of said first and second levers having an upper link member secured thereto adjacent said first and second lever upper end portions and each of said first and second levers having a lower link member secured thereto adjacent said first and second lever lower end portions, said upper and lower link members and other lever and link members connecting said first and second lever members to said respective steering yokes, said other lever and link members including levers disposed in vertical planes and pivotally secured to said vehicle body for movement in said vertical planes, said upper and lower link members arranged substantially parallel to each other, power operated means to rotate said connecting member and said first and second levers secured thereto to move said upper and lower link members reciprocally in substantially horizontal planes and in planes substantially parallel to the longitudinal axis of said vehicle to thereby move said steering yokes in a substantially horizontal plane to pivot said wheels about their steering axes, and means to actuate said power operated means.

2. A mine haulage vehicle having in combination a mobile body with a recessed material haulage compartment extending lengthwise thereof, a pair of front and a pair of rear steerable wheels carried by said mobile body on opposite sides of said material haulage compartment, each of said wheels having a steering yoke secured thereto and extending inwardly therefrom toward said material haulage compartment, said respective steering yokes arranged to pivot said wheels about substantially vertical steering axes, said recessed material haulage compartment extending downwardly between said pairs of steerable wheels to a position below the axes of rotation of said steerable wheels, a connecting member extending transversely of said mobile body beneath said material haulage compartment and between said pairs of front and rear wheels, a first lever secured substantially intermediate its ends to one end of said connecting member, a second lever secured substantially intermediate its ends to the other end of said connecting member, said first lever having a first link member connected thereto adjacent one end and extending forwardly toward said adjacent front wheel and a second link member secured to its other end and extending toward said adjacent rear wheel, said second lever having a third link member secured to one end and extending toward said adjacent rear wheel and a fourth link member secured to its other end and extending toward said adjacent front wheel, other lever and link members connecting said first, second, third and fourth link members to said respective adjacent steering yokes, said link members arranged substantially parallel to each other, power operated means to rotate said connecting member and said first and second lever members secured thereto to move said link members reciprocally in substantially horizontal planes and in planes substantially parallel to the longitudinal axis of said vehicle to pivot said wheels about their steering axes and means to actuate said power operated means.

3. A mine haulage vehicle having in combination a mobile body with a recessed material haulage compartment extending lengthwise thereof, said material haulage compartment having a pair of spaced vertical side walls, a pair of front and a pair of rear steerable wheels carried by said mobile body on opposite sides of said material haulage compartment in spaced relation with said haulage compartment side walls, each of said wheels having a steering yoke secured thereto and extending inwardly therefrom toward said material haulage compartment side walls, said respective steering yokes arranged to pivot said wheels about substantially vertical steering axes, said recessed material haulage compartment extending downwardly between said pairs of steerable wheels to a position below the axes of rotation of said steerable wheels, a connecting member extending transversely of said mobile body beneath said material haulage compartment and between said pairs of front and rear wheels, a first lever secured substantially intermediate its ends to one of said connecting members, a second lever secured substantially intermediate its ends to the other end of said connecting member, said first lever having a first link member connected thereto adjacent one end and extending forwardly toward said adjacent front wheel and a second link member secured to its other end and extending toward said adjacent rear wheel, said second lever having a third link member secured to one end and extending toward said adjacent rear wheel and a fourth link member secured to its other end and extending toward said adjacent front wheel, other lever and link members connecting said first, second, third and fourth link members to said respective adjacent steering yokes, an actuating mechanism pivotally secured at one end to said vehicle side wall, said actuating mechanism having an actuator portion secured to one of said first named levers and arranged to pivot one of said first named levers and thereby rotate said connecting member, said link members arranged in substantially parallel relation to each other and arranged to move reciprocally in substantially horizontal planes and in planes substantially parallel to the longitudinal axis of said vehicle to thereby move said steering yokes in a substantially horizontal plane to pivot said wheels about their steering axis, and means to actuate said actuating mechanism.

4. A mine haulage vehicle having in combination a mobile body with a recessed material haulage compartment extending lengthwise thereof, said material haulage compartment having a pair of spaced vertical side walls, a pair of front and a pair of rear steerable wheels carried by said mobile body on opposite sides of said material haulage compartment in spaced relation with said haulage compartment side walls, each of said wheels having a steering yoke secured thereto and extending inwardly therefrom toward said material haulage compartment side walls, said respective steering yokes arranged to pivot said wheels about substantially vertical steering axes, said recessed material haulage compartment extending downwardly between said pairs of steerable wheels to a position below the axes of rotation of said steerable wheels, a connecting member extending transversely of said mobile body beneath said material haulage compartment and between said pairs of front and rear wheels, a first lever secured substantially intermediate its ends to one end of said connecting member, a second lever secured intermediate its ends to the other end of said connecting member, a plurality of other levers pivotally secured to said material haulage compartment side walls intermediate their end portions and adjacent said wheels, each of said first and second levers having a link member secured thereto adjacent their upper end portion and adjacent their lower end portion, said link members connected to said adjacent other levers, and other link members connecting said other levers to said steering yokes, all of said levers being arranged in substantially parallel relation to each other and to the longitudinal axis of said vehicle and adjacent to said haulage compartment side walls, an actuating mechanism pivotally secured at one end to said vehicle side wall, said actuating mechanism having an actuator portion secured to one of said first named levers and arranged to pivot one of said first named levers and thereby rotate said connecting member, fluid pressure means to move said actuator portion relative to said actuating mechanism, said link members arranged to move reciprocally in a plane substantially parallel to the longitudinal axis of said vehicle to thereby move said steering yokes in a substantially horizontal plane to pivot said wheels about their steering axis, a steering assembly to actuate said actuating mechanism including a gear housing rigidly secured to one of said vehicle side walls, said gear housing having a horizontal bore therethrough extending substantially parallel to the longitudinal axis of said vehicle, a rack member positioned in said bore and arranged to move reciprocally therein in a direction substantially parallel to the longitudinal axis of said vehicle, said rack member having a geared portion, said gear housing having a top wall with an opening therethrough, a tubular support member secured to the top wall of said housing in overlying relation with said top wall opening, said tubular support member extending upwardly from said gear housing, a steering shaft rotatably supported in said tubular shaft and having one end portion extending into said gear housing passageway, a pinion gear coaxially secured to said steering end portion and in meshing relation with said rack member geared portion, a steering wheel rigidly secured to the other end of said steering shaft and arranged to rotate said steering shaft relative to said support member and thereby rotate said pinion gear and move said rack member reciprocally in said housing, a steering assembly link member connected at one end to said rack member free end portion, and a valve member connected at one end to the free end of said steering assembly link member, said valve member having a housing adapted to be connected at its other end to one of said steering yokes, said valve member operable to control the supply of fluid under pressure to said actuating mechanism.

References Cited in the file of this patent
UNITED STATES PATENTS

| | | |
|---|---|---|
| 719,562 | Brush | Feb. 3, 1903 |
| 1,747,768 | Fuller | Feb. 18, 1930 |
| 2,298,448 | Arentzen | Oct. 13, 1942 |
| 2,357,742 | Jeffrey | Sept. 5, 1944 |
| 2,358,236 | Lee | Sept. 12, 1944 |
| 2,590,300 | Dudley | Mar. 25, 1952 |
| 2,618,491 | Lee | Nov. 18, 1952 |
| 2,757,809 | Hagenbrook | Aug. 7, 1956 |